C. F. MARSTON.
SIGNAL DEVICE FOR VEHICLES.
APPLICATION FILED JUNE 11, 1910.
1,049,749.
Patented Jan. 7, 1913.
2 SHEETS—SHEET 2.
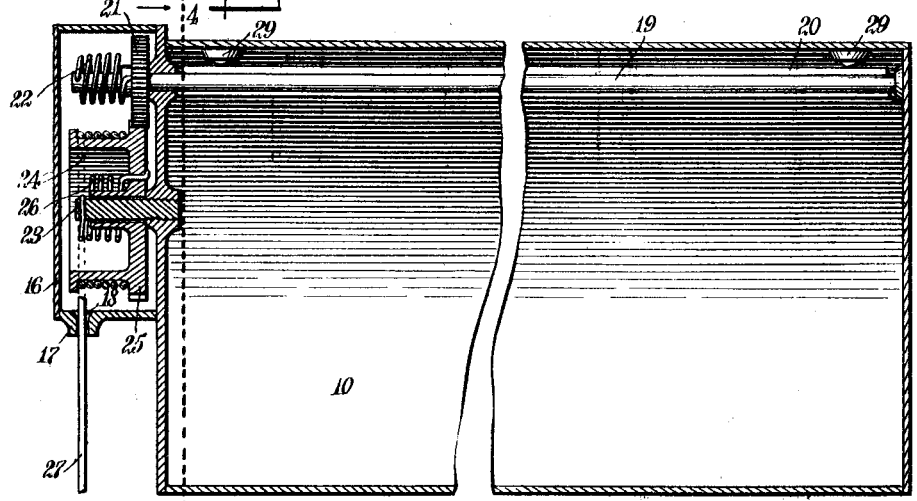
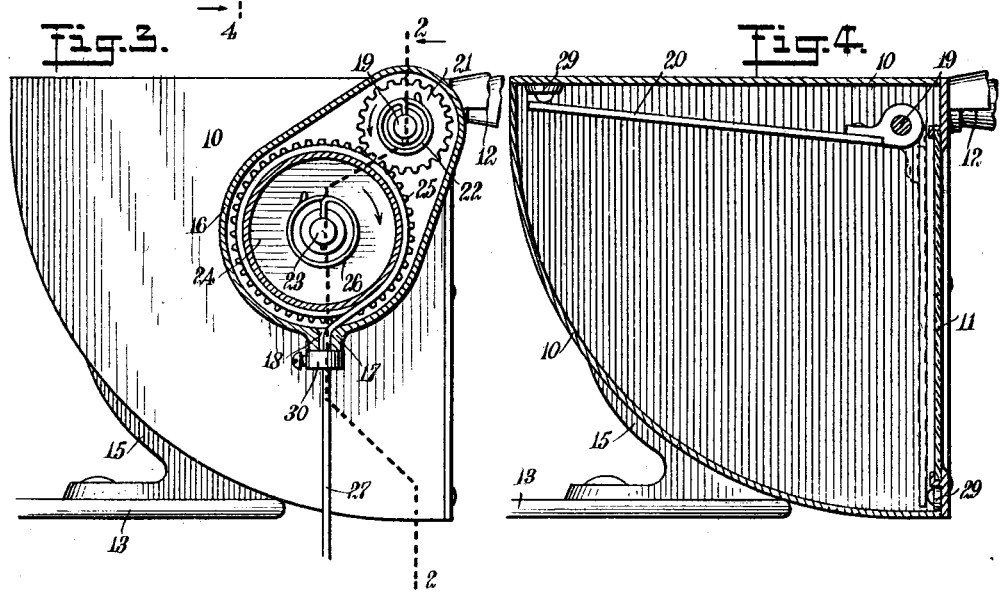
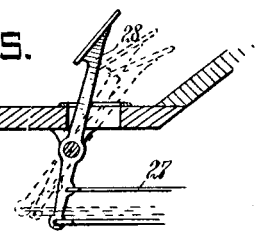
WITNESSES:
INVENTOR
Charles F. Marston
BY
ATTORNEYS

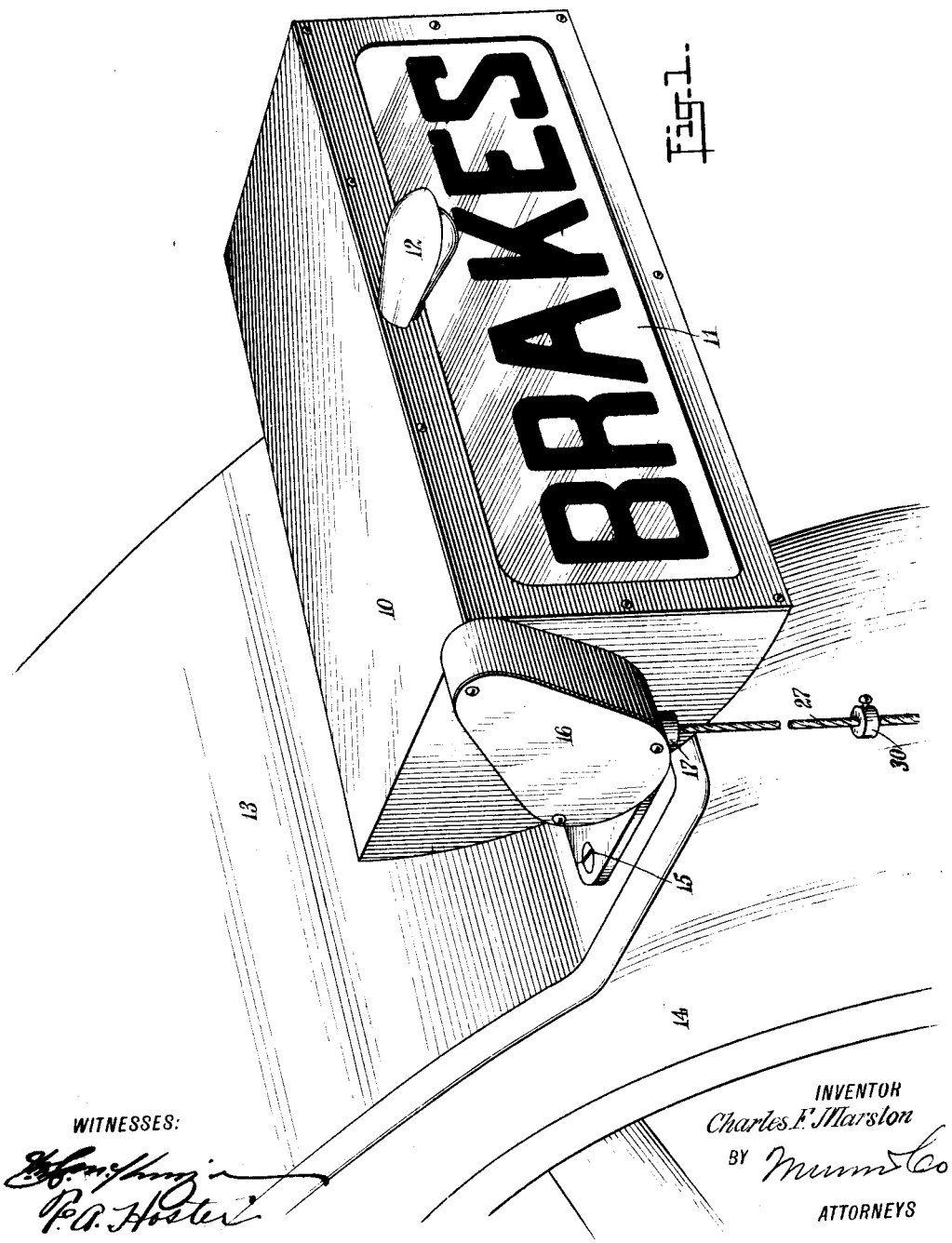

UNITED STATES PATENT OFFICE.

CHARLES F. MARSTON, OF GREAT NECK, NEW YORK.

SIGNAL DEVICE FOR VEHICLES.

1,049,749.      Specification of Letters Patent.      Patented Jan. 7, 1913.

Application filed June 11, 1910. Serial No. 566,288.

*To all whom it may concern:*

Be it known that I, CHARLES F. MARSTON, a citizen of the United States, and a resident of Great Neck, in the county of Nassau and State of New York, have invented a new and Improved Signal Device for Vehicles, of which the following is a full, clear, and exact description.

The invention relates to signal devices, more particularly adapted for use on automobiles and the like, and has for an object to provide a device for attachment at the rear of a vehicle to inform the operator of a second vehicle in the rear of the first vehicle, that the said first vehicle is slowing down or stopping, so that the said operator of the second vehicle will modify the speed of his vehicle to avoid colliding with the first vehicle.

For the purpose mentioned use is made of a casing for attachment to the rear of an automobile or like vehicle, and provided with an adequate signaling means connected with the brake mechanism of the vehicle so that when the brake is applied the signal will operate to inform the operator of a vehicle in the rear that the first vehicle is modifying its speed.

I am aware that several devices similar in some respects to my device, have been invented heretofore, the operation of the said devices being controlled by means especially provided therefor and entirely distant from the other parts of the vehicle for operating the same. In my device, however, I employ the brake mechanism of the vehicle to control the operation of the signal, and as the brake is applied the signal is automatically displayed to warn any following vehicle, it being understood that when the brake is released, the signal automatically disappears from view.

Reference is to be had to the accompanying drawings, constituting a part of this specification, in which similar characters of reference denote corresponding parts in all the views and in which—

Figure 1 is a perspective view showing a portion of the rear of an automobile with my device attached thereto and the signal displayed; Fig. 2 is a sectional view taken on the line 2—2 in Fig. 3 with the smaller gear wheel shown in full; Fig. 3 is an end view of my device; Fig. 4 is a sectional view taken on the line 4—4 in Fig. 2; and Fig. 5 is a sectional view of a brake pedal constituting the controller of my device, the dotted lines indicating various positions of the pedal.

Referring more particularly to the various views, a casing 10 is provided, having a curved rear side and provided with a glass front 11, over which is disposed a light 12 connected to any convenient lighting circuit. The casing 10 is attached to the end of a mud guard 13 of a vehicle 14, by suitable brackets 15. Secured to an end of the casing 10 is a second casing 16, provided at its lower end with a flange 17 having an opening 18 therein. Mounted horizontally in the casing 10 at the upper end thereof is a shaft 19, and rigidly secured to the said shaft is a sign 20, having a suitable word such as "Brakes" or the like thereon. Loosely mounted in the casing 16, on an end of the shaft 19, is a toothed gear wheel 21, and a flexible spring 22 is provided, having one end thereof secured to the toothed wheel 21 and the other end secured to the shaft 19. A bearing shaft 23 is secured to the casing 10, and loosely mounted thereon is a drum 24, having integral therewith a toothed gear wheel 25, in mesh with the toothed wheel 21. A spring 26 is disposed inside the drum 24, with an end of the spring secured to the drum and the other end thereof secured to the shaft 23. A rope or cord 27 is wound several times around the drum 24, and is then passed out of the casing 16, through the hole 18, and by suitable pulleys is carried to connect with the brake pedal 28 of the vehicle 14. Stop lugs 29, preferably of rubber, are disposed in the interior of the casing 10 and act as cushions for the sign 20, and an adjustable collar 30 is movably secured to the cord 27.

In the operation of my device, when the same is in normal or initial position, the sign 20 is not in view and is disposed as shown in Fig. 4. Now, suppose that the vehicle is moving along a street and approaches a corner where it is desired to slow down or stop. Upon applying the brake pedal 28 to decrease the speed of the vehicle, a pull is exerted on the cord 27, and as the proportion between the gear wheels 25 and 21 is of a convenient ratio, such as 2 to 1, when the drum 24 turns owing to the pull on the cord, the toothed wheel 21 is turned at twice the speed of the toothed wheel 25 and the shaft 19 is rotated, thus moving the sign 20 to the position shown in Fig. 1. The sign or signal is now in full view of the operator of any vehicle following the first vehicle, and the said operator, upon seeing the signal applies his brake and stops his vehicle, thus avoiding a rear end collision. As the sign 20 moves downwardly, the spring 25, acting under a torsion strain, is wound up, and as the brake pedal 28 is released the pull or torsion strain on the spring is released and the energy in the spring returns the sign to the position shown in Fig. 4. It oftentimes occurs however, that the length of the stroke of the brake pedal varies in different vehicles, especially in different types of automobiles. To balance the unusual length of the stroke of a brake pedal, the spring 22 is provided. When the sign 20 moves downwardly to the position shown in Fig. 1, the shaft 19 turns with the sign, owing to the force exerted through the spring 22 by the wheel 21 loosely mounted on the shaft 19. Now, suppose the sign to be in the position shown in Fig. 1, but the pedal has not reached the end of its stroke, then the drum 24 will continue to rotate and the toothed wheel 21 will rotate, but the turning force exerted by the wheel 21 will be absorbed by the flexible spring 22 and the force tending to turn the sign still farther, will be reduced to minimum. The spring 26, however, takes up the extra energy produced by the longer stroke of the pedal, so that when the pedal is released, the cord will be kept taut and will be rewound upon the drum 24. When my device has been attached to a vehicle, the amount of cord uncoiled from the drum can be easily estimated by experiment, and the stop collar 30 can then be secured to the cord so that when the sign is in the position shown in Fig. 4, the collar 30 will be in the position shown in Fig. 3. In this manner, the shock of the sign or signal returning to the normal position, will be greatly diminished by the collar 30 striking against the flange 17 just as the sign reaches the upper end of the casing.

From the foregoing description it will be seen that the signal is controlled solely by the action of the brake pedal, and thus the signal will only be displayed when the brake pedal is applied, and it will be further noticed that although my device is adaptable for all vehicles having brake mechanisms such as described, it is particularly adapted to automobiles.

Although for the purpose of describing my device, I have shown a particular construction of the same, it will be understood that the scope of my invention is defined in the herewith appended claims.

Having thus described my invention, I claim as new and desire to secure by Letters Patent:

1. A signal device comprising a casing, a shaft journaled in the casing, with an end of the shaft extending exteriorly of the casing, a toothed wheel freely rotatable on the said shaft exteriorly of the casing, a drum mounted to turn on the casing and provided with an integral toothed wheel in mesh with the wheel on the said shaft, a signal mounted in the casing and adapted to be swung by the said shaft, a brake mechanism, and a flexible connection between the said drum and said brake mechanism for operating the said signal when the brake mechanism is operated, the said connection being adapted to partially wind up on the said drum.

2. A signal device comprising a casing, a shaft journaled in the casing and extending longitudinally thereof, a signal carried on the shaft and adapted to swing within the casing, a drum carried by the casing, means for supporting the said drum, a spiral spring, one end of the spring being in engagement with the said drum and the other end thereof being in engagement with the said supporting means, a wheel between the said longitudinally extending shaft and the said drum, together with means for turning the drum, whereby the said shaft will be turned and the signal operated, the release of the said operating means permitting the said spiral spring to return the drum to normal position, which position is maintained by the said spring.

3. A signal device for vehicles comprising a casing, a second casing secured to the first casing, a shaft journaled in the first casing and extending into the second casing, a signal secured to the shaft and mounted to swing in the casing, a toothed wheel loosely mounted on the shaft in the second casing, a coiled spring secured to the shaft and the toothed wheel, a drum provided with an integral toothed wheel and mounted to turn in the second casing with the said integral toothed wheel in mesh with the toothed wheel on the shaft, a coiled spring disposed in the drum and secured to the drum and the shaft in which the drum is mounted, a cable encircling the drum and secured thereto, and a brake mechanism on the vehicle and connected with the cable to operate the said signal when the brake mechanism is operated.

In testimony whereof I have signed my name to this specification in the presence of two subscribing witnesses.

CHARLES F. MARSTON.

Witnesses:
F. A. HOSTER,
PHILIP D. ROLLHAUS.